(12) United States Patent
Pank

(10) Patent No.: US 7,182,856 B2
(45) Date of Patent: Feb. 27, 2007

(54) STORMWATER TREATMENT TRAIN

(76) Inventor: Thomas E. Pank, 10546 Harp Rd., Walkersville, MD (US) 21793

( * ) Notice: Subject to any disclaimer, the term of this patent is extended or adjusted under 35 U.S.C. 154(b) by 0 days.

(21) Appl. No.: 10/306,606

(22) Filed: Nov. 27, 2002

(65) Prior Publication Data

US 2003/0127377 A1    Jul. 10, 2003

Related U.S. Application Data

(63) Continuation-in-part of application No. 10/040,611, filed on Jan. 9, 2002, now Pat. No. 6,869,528.

(60) Provisional application No. 60/337,545, filed on Dec. 1, 2001, provisional application No. 60/271,065, filed on Feb. 26, 2001.

(51) Int. Cl.
*B01D 35/00* (2006.01)
(52) U.S. Cl. .................. 210/97; 210/170; 210/257.1; 210/259; 210/338; 405/53
(58) Field of Classification Search ............. 405/44, 405/52–127, 129.1–129.95; 210/97, 109, 210/137, 111, 170, 257.1, 259, 338; 404/4, 404/5
See application file for complete search history.

(56) References Cited

U.S. PATENT DOCUMENTS

| 210,113 A | 11/1878 | Gates |
| 296,938 A * | 4/1884 | Emory ........................ 298/6 |
| 300,612 A | 6/1884 | Kester |
| 426,489 A * | 4/1890 | Connolly ................... 210/337 |
| 575,478 A | 1/1897 | Maefner |
| 620,316 A | 2/1899 | Haselden |
| 631,128 A | 8/1899 | Ricketts |
| 745,497 A | 12/1903 | Hood |
| 789,968 A | 5/1905 | Ernst |
| 945,989 A | 1/1910 | Sponenburger |
| 988,391 A | 4/1911 | Shillington |
| 1,033,329 A | 7/1912 | Lauglin |
| 1,090,283 A | 3/1914 | Crandall |
| 1,140,726 A * | 5/1915 | Warden ...................... 210/338 |
| 1,793,080 A | 2/1931 | Glover |
| 1,956,132 A | 4/1934 | Pholnberb |
| 2,322,548 A * | 6/1943 | Miroslav ..................... 55/484 |
| 2,405,838 A | 8/1946 | Lawson et al. |
| 2,723,035 A | 11/1955 | Anderson |
| 2,742,160 A | 4/1956 | Fogwell |
| 3,733,095 A * | 5/1973 | Sinclair et al. .............. 290/52 |

(Continued)

FOREIGN PATENT DOCUMENTS

WO    WO 01/89998 A1 * 11/2001

OTHER PUBLICATIONS

Disclosure of Stormwater Separator, 10 pages.

*Primary Examiner*—Terry K. Cecil
(74) *Attorney, Agent, or Firm*—William D. Hall

(57) ABSTRACT

A system is provided for treating runoff water in which there is a separator and a filter for cleaning the water. A reservoir is provided to hold large quantities of water during prolonged rainstorms. The output of the reservoir is fed to the filter. The rate of flow from the reservoir to the filter is controlled and limited to flow rates at which the filter can efficiently clean the water.

7 Claims, 8 Drawing Sheets

U.S. PATENT DOCUMENTS

| | | | |
|---|---|---|---|
| 3,807,570 A | 4/1974 | Allan | |
| 4,045,346 A | 8/1977 | Swaskey | |
| 4,104,166 A * | 8/1978 | LaRaus | 210/195.1 |
| 4,261,823 A | 4/1981 | Gallagher et al. | |
| 4,297,219 A | 10/1981 | Kirk et al. | |
| 4,708,792 A * | 11/1987 | Takarabe et al. | 210/150 |
| 4,752,396 A | 6/1988 | Schmitt | |
| 4,844,819 A * | 7/1989 | Norman | 210/801 |
| 4,861,465 A | 8/1989 | Augustyniak | |
| 4,985,148 A | 1/1991 | Monteith | |
| 5,122,270 A | 6/1992 | Ruger et al. | |
| 5,133,619 A | 7/1992 | Murfae et al. | |
| 5,160,039 A | 11/1992 | Colburn | |
| 5,223,154 A | 6/1993 | MacPherson, Jr. et al. | |
| 5,266,191 A * | 11/1993 | Greene et al. | 210/195.1 |
| 5,269,921 A | 12/1993 | Ruger et al. | |
| 5,431,813 A | 7/1995 | Daniels | |
| 5,433,845 A * | 7/1995 | Greene et al. | 210/170 |
| 5,435,910 A * | 7/1995 | Verret | 210/86 |
| 5,437,786 A * | 8/1995 | Horsley et al. | 210/170 |
| 5,480,254 A | 1/1996 | Autry et al. | |
| 5,511,904 A | 4/1996 | Van Egmond | |
| 5,531,888 A | 7/1996 | Geiger et al. | |
| 5,562,819 A | 10/1996 | Turner, Jr. et al. | |
| 5,632,889 A | 5/1997 | Tharp | |
| 5,643,445 A | 7/1997 | Billias et al. | |
| 5,650,065 A | 7/1997 | Sewell | |
| 5,690,827 A * | 11/1997 | Simmering et al. | 210/602 |
| 5,707,527 A | 1/1998 | Knutson et al. | |
| 5,725,760 A | 3/1998 | Monteith | |
| 5,730,878 A * | 3/1998 | Rice | 210/662 |
| 5,744,048 A | 4/1998 | Stetler | |
| 5,746,911 A * | 5/1998 | Pank | 210/170 |
| 5,759,415 A | 6/1998 | Adams | |
| 5,770,057 A | 6/1998 | Filion | |
| 5,779,888 A | 7/1998 | Bennett | |
| 5,788,848 A | 8/1998 | Blanche et al. | |
| 5,814,216 A | 9/1998 | Filion | |
| 5,820,762 A | 10/1998 | Bamer et al. | |
| 5,849,181 A | 12/1998 | Monteith | |
| 5,904,842 A | 5/1999 | Billias et al. | |
| 5,958,226 A | 9/1999 | Fleischmann | |
| 6,027,639 A | 2/2000 | Lenhart, Jr. et al. | |
| 6,062,767 A | 5/2000 | Kizhnerman et al. | |
| 6,068,765 A | 5/2000 | Monteith | |
| 6,077,448 A | 6/2000 | Tran-Quoc-Nam et al. | |
| 6,080,308 A | 6/2000 | Williamson | |
| 6,086,756 A | 7/2000 | Roy | |
| 6,086,758 A | 7/2000 | Schilling et al. | |
| 6,096,200 A | 8/2000 | Bennett | |
| 6,099,729 A | 8/2000 | Cella et al. | |
| 6,190,545 B1 | 2/2001 | Williamson | |
| 6,200,484 B1 | 3/2001 | McInnis | |
| 6,217,757 B1 | 4/2001 | Fleischmann | |
| 6,241,881 B1 | 6/2001 | Pezzanili | |
| 6,251,269 B1 | 6/2001 | Johnson et al. | |
| 6,264,835 B1 * | 7/2001 | Pank | 210/170 |
| 6,270,653 B1 | 8/2001 | Gochlin et al. | |
| 6,315,897 B1 | 11/2001 | Maxwell | |
| 6,372,128 B1 * | 4/2002 | Belhumeur | 210/137 |
| 6,506,298 B2 * | 1/2003 | Albert | 210/137 |
| 2002/0096247 A1 | 7/2002 | Wydeven | |
| 2003/0024863 A1 * | 2/2003 | Gannon et al. | 210/134 |
| 2003/0089652 A1 * | 5/2003 | Matsui et al. | 210/163 |

\* cited by examiner

STORMWATER TREATMENT TRAIN

RELATED APPLICATION

I claim the benefit of my prior now abandoned Provisional Application Ser. No. 60/337,545 filed Dec. 1, 2001, entitled Stormwater Runoff Treatment Train. This application is a continuation in part of my prior application Ser. No. 10/040,611 filed Jan. 9, 2002, now U.S. Pat. No. 6,869,528, which in turn claims the benefit of Provisional Application Ser. No. 60/271,065 filed Feb. 26, 2001.

BACKGROUND OF THE INVENTION

This invention is intended to improve the quality of stormwater runoff from developed impervious surfaces. Stormwater runoff from impervious surfaces like parking lots contains many different contaminants, such as sediments, nutrients, heavy metals, and organic chemicals. In most developed areas of the United States, this runoff is collected in pipes and discharged directly into a stream or other water body. The present invention provides a means by which some of the environmentally detrimental constituents may be removed from the water.

During the last ten years, a new industry has developed to treat stormwater runoff. To date, the main focus of this industry has been removing suspended solids from the water. Solids can be removed by physical separation, which is most easily achieved by reducing water velocities and allowing the solids to settle out of the water. This is the theory behind the ponds, sediment basins, and hydrodynamic separators that comprise the majority of commercially available stormwater treatment devices. Much of the pollution in stormwater runoff, however, is not suspended, but instead dissolved in the water. These dissolved contaminants require more effective treatment, hence a filter is often used. However, all of the devices now in use become quite inefficient when there is a high rate of flow through them.

Assume that the runoff water from a filling station has both suspended contaminants and dissolved contaminants. This runoff water will be cleaned by my invention as follows: Such runoff water first enters a gravity particle separator such as is taught in my U.S. Pat. Nos. 5,746,911 and 6,264,835. The disclosures of these patents are incorporated herein by reference. This particle separator removes suspended contaminants from the runoff water. The output of the particle separator is fed to a reservoir which is so big that it will hold all of the water from a prolonged hard rain lasting several hours. The output of the reservoir is fed through a limiter to a filter which removes dissolved contaminants from the water. The filter conforms to my copending patent application Ser. No. 10/040,611, filed Jan. 9, 2002, now U.S. Pat. No. 6,869,528 of Mar. 22, 2005 (the disclosure of this patent is incorporated herein by reference), see also patent application publication US/2002/0117435 A1. Such a filter is inefficient if the flow therethrough exceeds a given rate. The aforesaid limiter prevents the flow to the filter from exceeding said given rate.

SUMMARY OF THE INVENTION

The present invention avoids the inefficiency of the prior art by storing the incoming water in a reservoir and limiting the flow rate from the reservoir to the device or devices that clean the water. For example, during a prolonged rainstorm the water collects in a reservoir which has a flow limiting device at its output that limits the flow rate to a rate at which the flow cleaning device (gravity separator, filter, etc.) can efficiently clean the water.

The invention contemplates that any suitable flow limiting device may be used to limit the rate of flow of water from the reservoir to the fluid cleaning device (gravity separator, filter, etc.) to a rate that the cleaning device can handle efficiently. The prior art teaches many such flow limiting devices, per se. They range from a float (on the surface of the water in the reservoir) controlling a valve in the outlet of the reservoir to a small induction motor driving a pump, which motor during high rates of flow acts as a generator and thereby controls the rate of flow of water. To summarize, the output of the reservoir is preferably held to a relatively constant rate of flow that renders the filter or other cleaning device efficient.

The present invention involves a single process for the treatment of stormwater runoff. The invention relies on extended detention to remove sediments and associated pollutants (many detrimental pollutants adsorb, or attach themselves, to the surface of suspended sediment particles). Following extended detention, the water is transferred to a filter, which removes dissolved pollutants, as well as any very small suspended particles that escape from the extended detention phase. The present invention includes a pump that regulates flow through the filter unit, as well as mechanisms to clean the filters with excessive maintenance requirements.

The present invention improves upon the prior art in several significant ways. The prior art relies solely on gravity flow to drive stormwater runoff through the treatment process. The present invention, however, uses a pump or other energy source to drive the water in cases where the elevation differences on the site are not sufficient to impart this energy. This energy sources makes the present invention far more flexible than the prior art in terms of range of applications.

The prior art also overwhelmingly relies on a single technology to treat stormwater runoff. The present invention, though, incorporates different technologies, each aimed at a different constituent of stormwater runoff. While the application of any one of these technologies is a commonly used treatment method that is generally effective for a single contaminant species, the combination of the several methods allows the stormwater treatment device to remove a broad range of potential pollutants.

A filter is hereby defined as a porous device for removing impurities from a liquid passed through it.

DETAILED DESCRIPTION OF THE INVENTION

The present invention combines several different technologies for the treatment of Stormwater runoff into a single train. The invention includes (a) a physical separator to remove suspended particles, with specific gravities greater or less than one, from water, (b) a filter that removes dissolved contaminants, as well as small particulate contaminants that escape from the separator, from water, and (c) the associated means and conveyances required to deliver the water to each phase of the treatment device.

Preferred Form of the Invention

Figure 1:
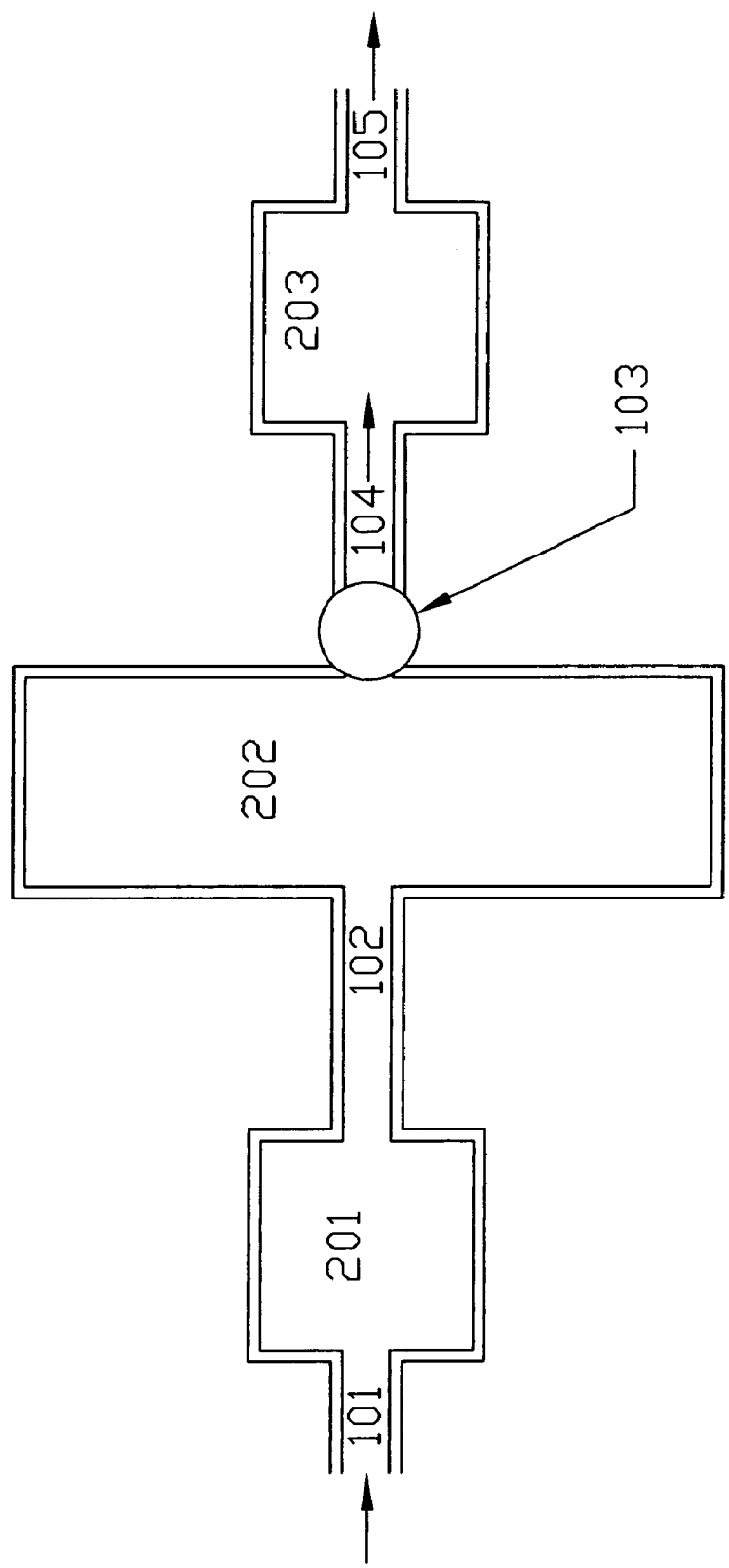
FIG. 1 is a block diagram of the Preferred Form of the Invention.

The preferred form of the invention is shown in FIG. 1. An inlet means 101 delivers the influent runoff rainwater to the system. The inlet means discharges the contaminated water into a physical separator 201. This physical separator is a device such as is disclosed in my U.S. Pat. No. 5,746,911 and 6,264,835. The disclosures of these two patents are incorporated herein by reference. The separator 201 relies on gravity to separate suspended particles with a density greater than the density of water from the influent water, and the water exiting the separator 201 has a significantly lower concentration of suspended pollutants than the influent water. A conduit 102 accepts the water exiting the separator, and delivers the water to a large reservoir 202. This reservoir contains a regulated discharge means 103 that controls the flow rate of the water leaving the reservoir. This discharge means conveyance that has the capacity to regulate the flow rate. A pump, for example, may have a control or other means to limit end control the rate of flow through the pump. The regulated discharge delivers the water to a second conduit 104, which delivers the water to the filter 203. The filter 203 is a device such as that described in my prior copending patent application Ser. No. 10/040,611, filed Jan. 9, 2002 and entitled Filtering System for Runoff Water. This application has matured into U.S. Pat. No. 6,869,528, the disclosure of which is incorporated by reference. Intended to remove both dissolved and particulate pollutants from water by use of a filter media, the filter 203 may use any of various types of media to accomplish this removal, end the media may be tailored for the specific contaminants expected in the stormwater runoff. The water passes through the filter 203 and then enters a conduit 105 which delivers the treated water to an outfall such as a river.

Figure 5:
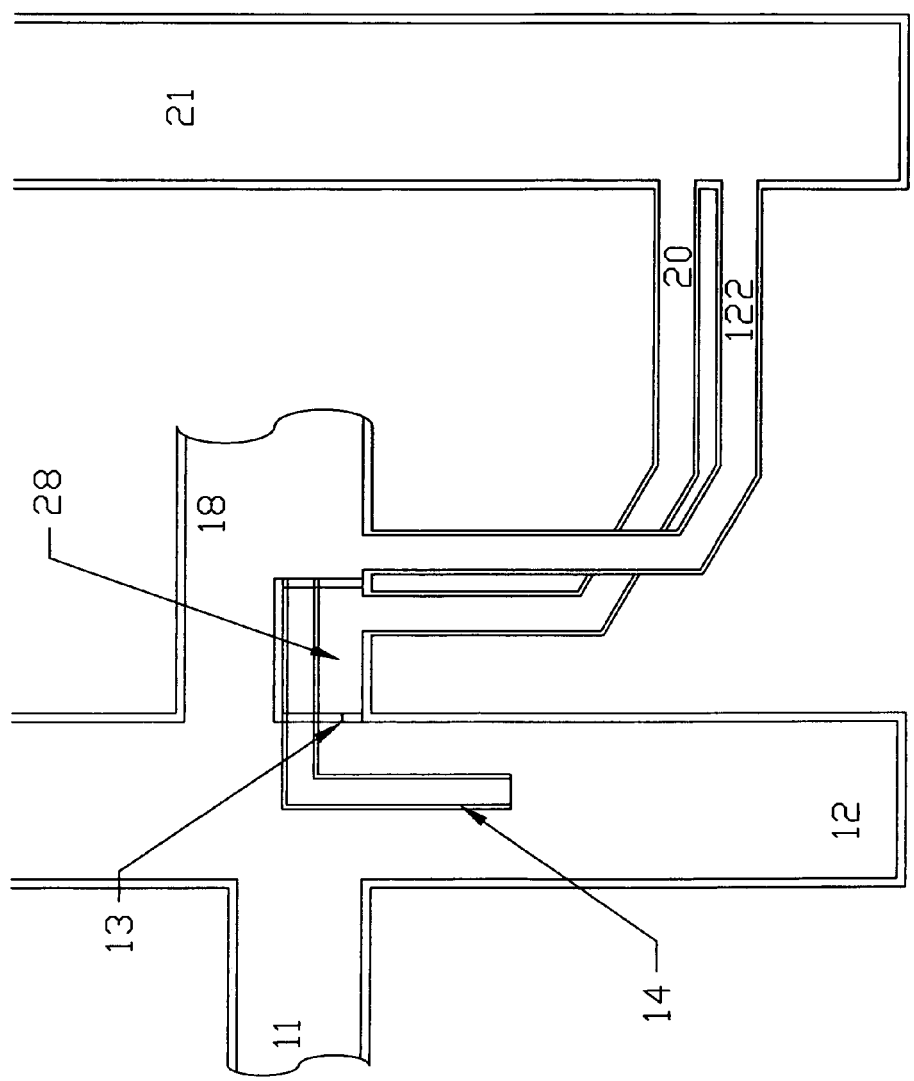
FIG. 5 is a schematic drawing of one form that the particle 201 may take.

Rainwater that runs off of a parking lot, or off the pavement of a filling station, passes via inlet 11 into inlet tank 12 (see FIG. 5). When the water is entering tank 12 at a very low rate, the surface water and/or oil, in the inlet tank drains via weir 13 and pipe 122 to a main separation tank 21 where the oil floats on clean water. That clean water is fed via pipe 20 to an outlet conduit 18. When the inlet flow increases to an intermediate rate, a pipe 14 of inverted L-shape feeds clean water from the inlet tank 12 to the outlet conduit 18. When the inlet fluid has a very large flow rate, as might occur during a heavy downpour of rain, the fluid level in the inlet tank 12 rises to a level at which there is a direct flow from inlet 11 into the outlet conduit 18.

The conventional prior art relies on gravity separation to remove oils from stormwater runoff. Free oils can be removed by this method, but emulsified and dissolved oils cannot. The present invention makes use of a fine filter media to trap those oils that cannot be removed in a conventional gravity separator. Used in conjunction with the gravity separator of FIG. 5, the filter shown in FIGS. 6 to 8 comprises apparatus for the removal of oils from runoff water.

The filter comprises a number of cylindrical cells, such as 310A, 310D, 310C, etc. Each cell is a complete filter and comprises several layers or laps such as a lap composed of coarse filtering material 326, a lap such as the first porous barrier, a lap such as a second or fine filtering material, a lap such as a second porous barrier and a lap such as a drain.

Figure 6:
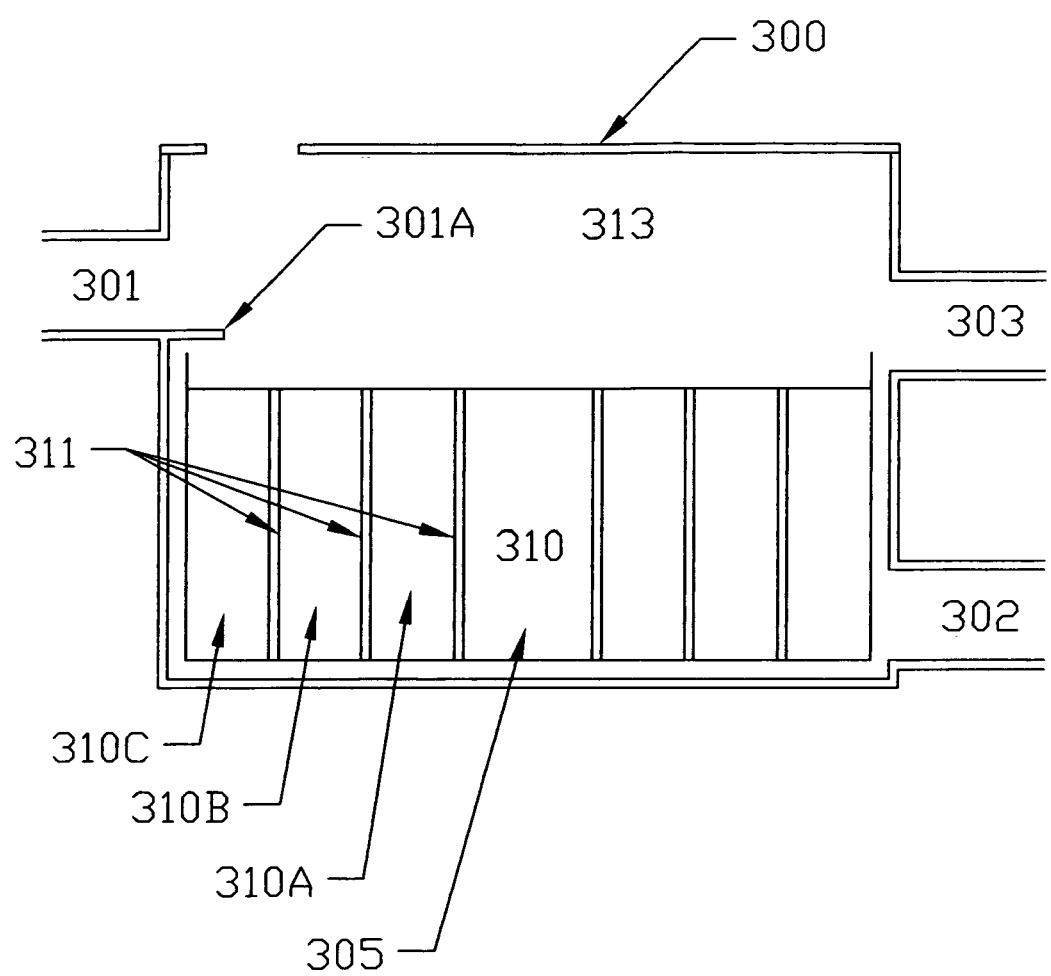
FIG. 6 is a sectional view of the filter used with this invention.
Figure 8:
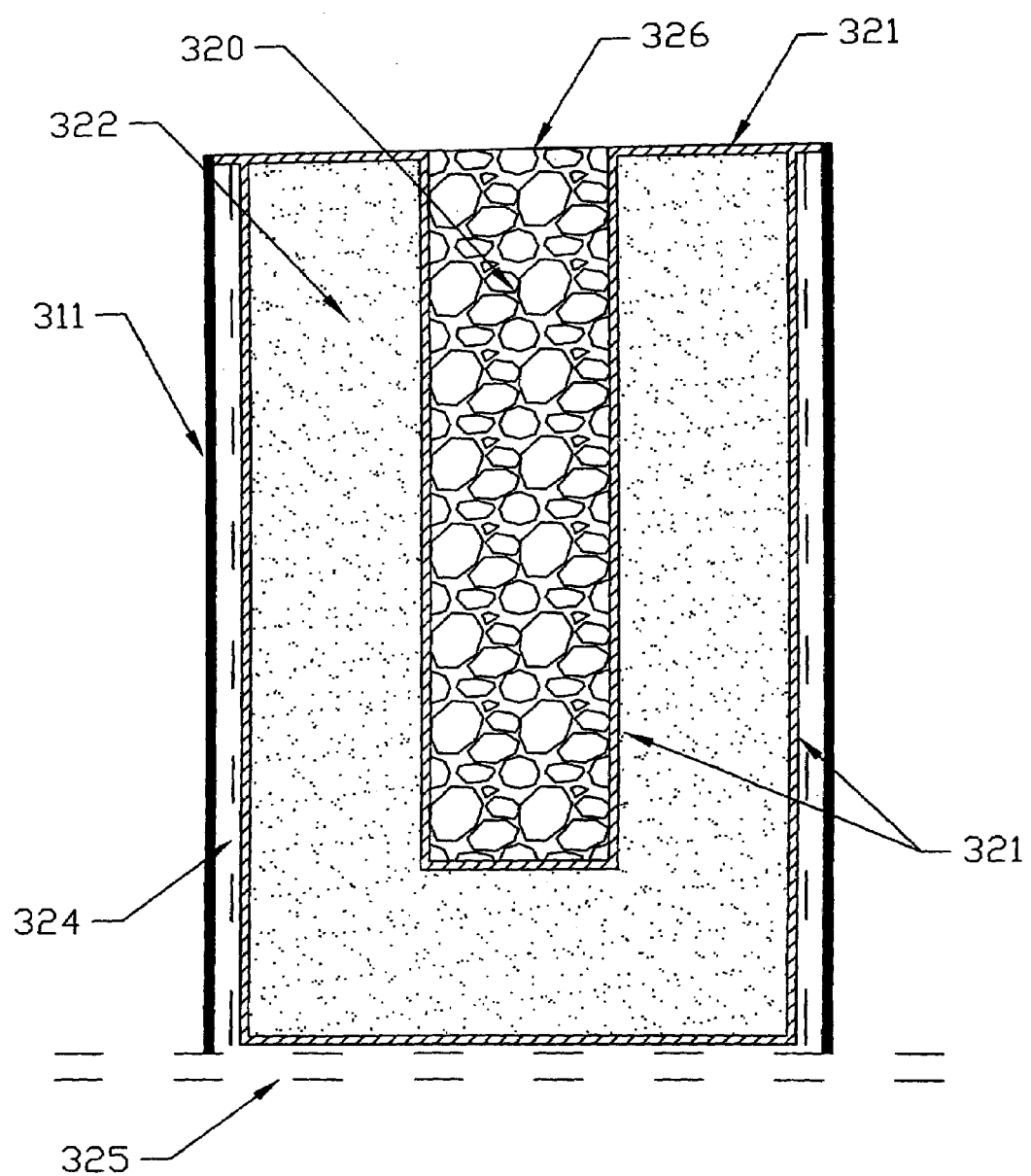
FIG. 8 is a cross-sectional view of each of the layers 310 310A and 310B.

The filter has two opposing sides, one of which sides comprises the upper ends of the cells 310, 310A and 310B of FIGS. 6 and 8 and the other of which sides comprises the lower end of said cells 310, 310A and 310B.

Figure 7:
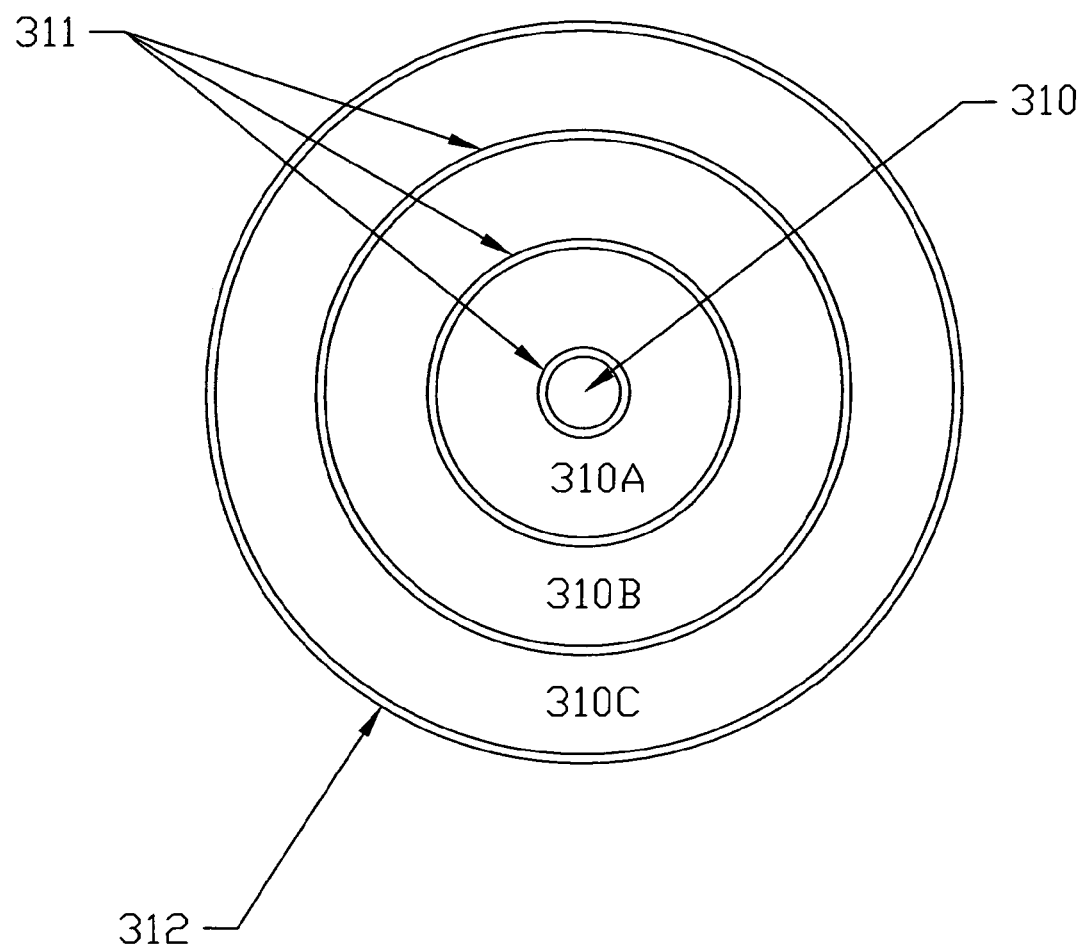
FIG. 7 is a plan view of the filter 305 for the preferred form of the invention.

In FIGS. 6 and 7, there is a tank 300 that has an inlet conduit such as pipe 301, a clean water outlet conduit such as pipe 302, and an overflow outlet conduit such as pipe 303. The clean water outlet pipe 302 is at a substantially lower elevation than the inlet pipe 301, and the overflow outlet pipe 303 is at the same elevation as the inlet pipe 301. There is a spillway 301A at the end of inlet pipe 301 that extends to the edge of the filter mechanism 305. The clean water outlet conduit 302 and overflow outlet conduit 303 may be kept separate to maintain segregated waste streams, or may be combined into a single outlet conduit.

The filter mechanism 305 is shown in FIGS. 7 and 8. The filter mechanism is divided into concentric filter cells 310 and 310A by inner walls 311, and surrounded by outer wall 312. Outer wall 312 is taller than inner walls 311.. A reservoir 313, with one side, in this case the bottom side, perforated. The reservoir is formed by outer wall 312 and the tops of the filter cells 310 and 310A, 310B, etc.

Each interior filter cell 310, 310A and 310B is constructed as shown in FIG. 8. The inner walls 31 constitute the vertical boundaries of the cell, and perforated plate 325 constitutes the floor. The entire filter mechanism 305 is held above the floor of tank 300 in any suitable way. A drain 324 is fastened along the inside of the inner walls 311. The drain is bounded by barrier 323, which separates the drain 324 from a fine filter media 322. Barrier 323 is a geotextile or similar device that is fine enough to retain fine filter media 322, but porous enough to allow water to pass through it. A second barrier 321 separates the fine filter media 322 from a coarse material 320. Barrier 321 is a geotextile or similar device that is fine enough to retain fine filter media 322, but porous enough to allow water to pass through it. Barrier 321 extends along the top of the fine filter media 322 to the inner wall 311.

The tank 300 is a large chamber. Inside of the large chamber is a smaller chamber 312 containing the filter cells 310 and 310A. Each filter cell, such as those shown in FIGS. 7 and 8, has a first passageway along the vertical center line of the cell and containing the first filter media 320. A second passageway, is in the form of drain 324. The fine (second) filtering media comprises the second filtration media.

The filter cell 310A is shown in FIGS. 5 and 6. An inner wall 311 forms one vertical boundary, while the outer wall 312 forms the other vertical boundary. Perforated plate 325, drain 324, barrier 323, fine filter media 322, barrier 321, and coarse material 320 are arranged as they are in the aforementioned interior filter cell 310.

When the runoff entering inlet pipe 301 has a low rate of flow, the water is passed from spillway 301A into reservoir 313 above filter mechanism 305. Because the oil entering the system is emulsified or dissolved, the oil does not remain on top of the water in reservoir 313, but is instead mixed throughout the water. From reservoir 313, the water flows into each lap of coarse material 320. Coarse material 320 has a large volume of voids and provides little resistance to the flow of water, that the water is distributed evenly throughout coarse material 320.

The water fed to a layer or lap of coarse material 320 may flow from the coarse material 320 in three directions. First it may flow in a direction away from the center of the filter to the first drain, secondly it may flow toward the center of the filter to the first drain, and thirdly the water may flow from the coarse material 320 vertically downward to the fine filtering material.

As coarse material 320 becomes saturated, the runoff water will penetrate barrier 321 and enter fine filter media 322. Fine filter media 322 provides significantly more resistance to flow than does coarse material 320. Furthermore, the finer particles create a more tortuous flow path, allowing for longer contact time between the runoff water and the fine filter media 322, and therefore more efficient pollutant removal. As the fine filter media 322 slowly becomes saturated, the filtered runoff water will then penetrate barrier 323 and enter drain 324.

Drain 324 is simply an open space that allows the water to flow down along interior wall 311 or outer wall 312 to perforated plate 325. The water flows through the perforations in plate 325 and back into tank 300. From tank 300, the water flows to outlet outlet pipe 302 which delivers the filtered runoff water to a sewer or stream.

When runoff water enters the inlet pipe 301 at a high rate of flow, the fine filter media 323 restricts the flow through filter cells 310 and 310A, and therefore restricts the flow through filter mechanism 305. In this case, the overflow outlet pipe 303 accepts the excess water from the surface of the reservoir 313 through overflow inlet 303A. Overflow pipe 303 delivers the unfiltered water to a sewer or stream. This can be the same sewer or stream that clean water outlet pipe 302 discharges to, or it can be a different discharge point.

The runoff water may vary from a very low rate to a very high rate. At high rates the filter 203 is inefficient.

The reservoir 202 is preferably so big that it will hold all the water from a prolonged hard rain, lasting several hours, but the outlet pipe of the reservoir is so small (or has a restriction) limiting the flow, or has other suitable means for controlling the flow, so that the flow rate therethrough is not only within the capacity of the filter but takes at least one hour to drain the reservoir.

First Modified Form of the Invention

The function of the reservoir 202 and the pump 103 (or other flow limiting device) is to take the widely varying incoming flow and convert it to a relatively steady, more constant, flow rate and thereby improve the efficiency of the filter 203.

Figure 2:
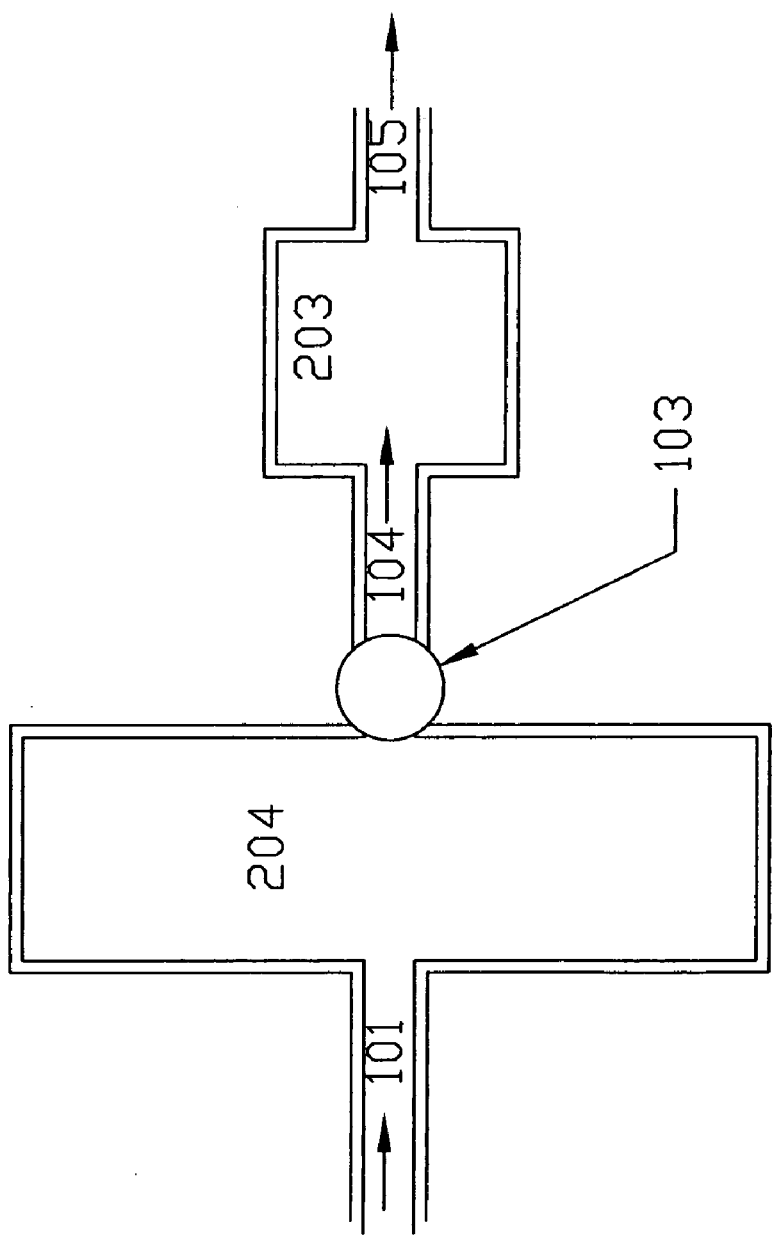
FIG. 2 is a block diagram of a First Modified Form of the Invention.

A second form of the invention is shown in FIG. 2, in which the physical separator and reservoir are combined into a single unit 204. In this case, the inlet conduit 101, regulated discharge means 103, conduit 104, filter 203, and discharge conduit 105 are as described in the preferred form of the invention, and serve the same purposes.

In this form of the invention, a single large container 204 acts as both physical separator and reservoir. The container is capable of holding all the water from a prolonged hard rain, and the conduit 104 is sized or designed such that it takes at least one hour to fully drain the tank.

Second Modified Form of the Invention

Figure 3:
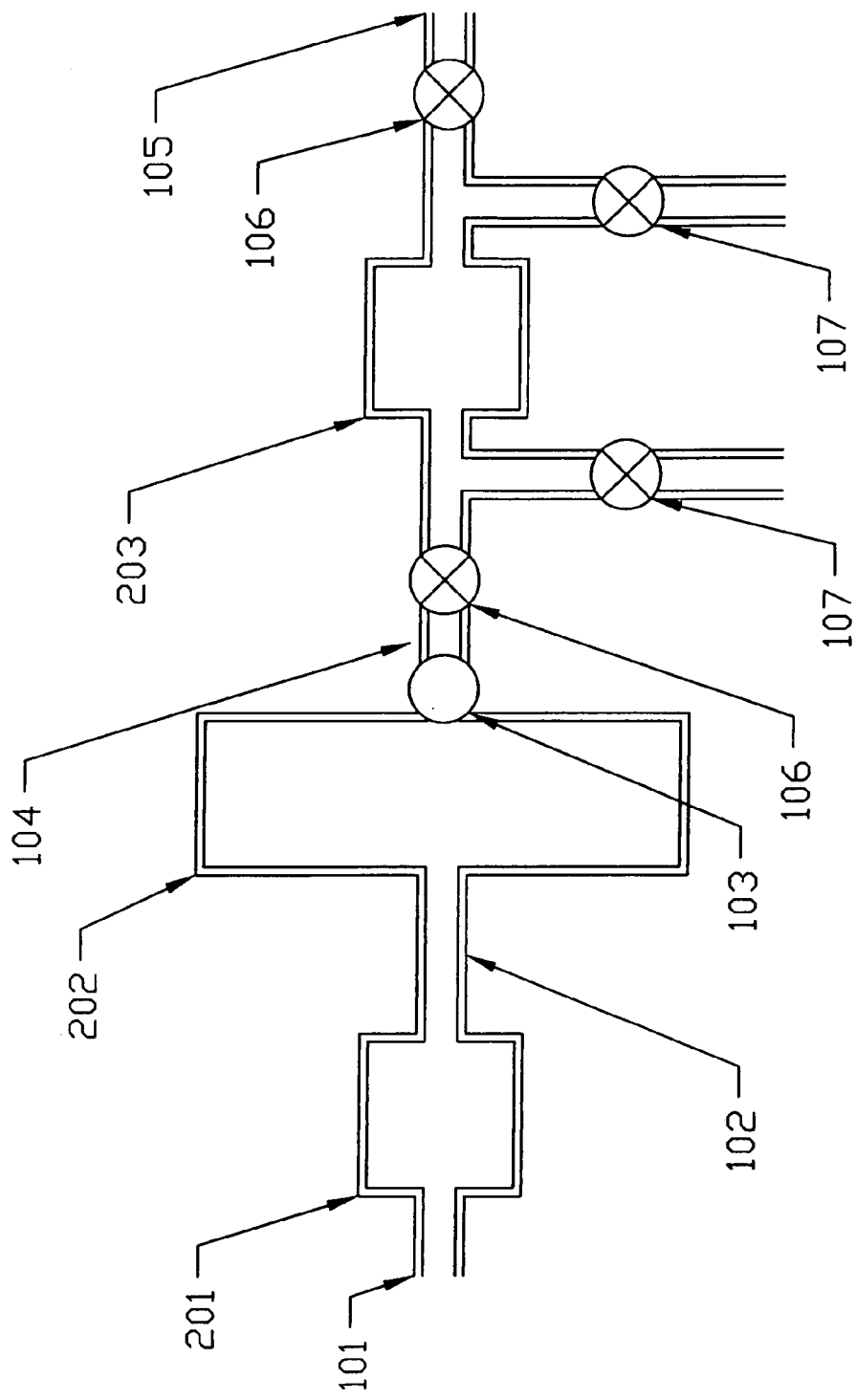
FIG. 3 is a block diagram of a Second Modified Form of the Invention.

FIG. 3 illustrates another form of the invention, in which the filter 203 can be backwashed without additional equipment. In FIG. 3, the inlet conduit 101, physical separator 201, reservoir 202, regulated discharge 103, conduit 104, filter 203, and outlet conduit 105 are as described in the preferred form of the invention, and serve the same purposes. However, an additional backwash water source 205 and backwash water collector 206 are also included. This source 205 may be a container that is part of the system, or it may simply be a connection to which a separate container can be joined. In addition to the backwash water source 205, four valves are also included in this form of the invention. During normal operation, valves 106 are open, and valves 107 are closed. In this case, the second modified form of the invention functions in the same manner as the preferred form.

With normal use, filters become clogged, and require maintenance. This form of the invention allows the filter 203 to be backwashed without additional equipment. To do this, valves 106 are closed, and valves 107 are opened. The backwash water source 205 discharges water through the filter 203. This reverse flow cleans the filter, and the wash water is collected in backwash water collector 206. The backwash water is removed from the backwash water collector and disposed of.

Third Modified Form of the Invention

Figure 4:
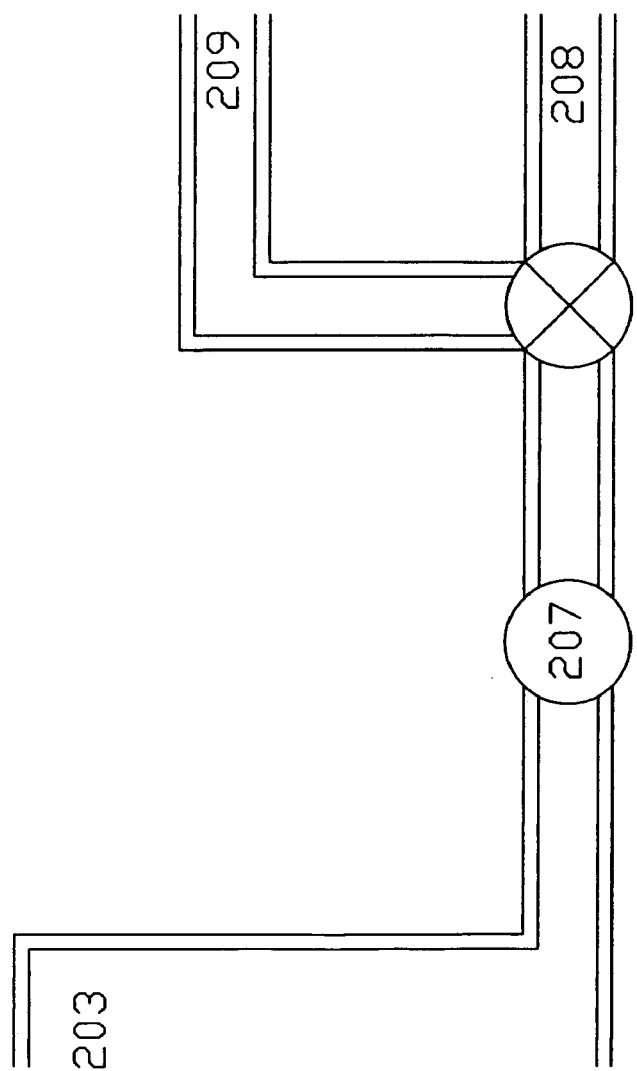
FIG. 4 is a sectional view of the discharge end of a third modified form of the invention.

FIG. 4 shows apparatus that may be added to the outlet conduit 105 of the invention. In this case, fluid in outlet conduit 105 does not flow by gravity. Instead, pump 207 imparts the necessary energy to the water to provide effluent flow from the invention. Conduit 105 leads to recharge trench 208, which allows the treated water to percolate into the surrounding soils, recharging the groundwater. Alternatively, conduit 105 could flow to high-elevation outfall 209, which is above conduit 105 in elevation. This form of the invention can be used on sites in which elevation constraints limit the choice of treatment methods for stormwater runoff.

"Runoff water", as used in this specification and claims, is defined as stormwater from impervious surfaces like parking lots, and filling stations, and contains contaminants.

Fourth Modified Form of the Invention

The filter of FIGS. 6 to 9 may be inverted so that water enters the lower end of the filter and is discharged from its upper end. Such a filter is shown in FIGS. 9 and 11 of my parent U.S. Pat. No. 6,869,525. The reservoir feeding the inverted filter may have a by-pass outlet which allows water in the reservoir above a given level to by-pass the filter. Such a by-pass is well known and is shown in said U.S. Pat. No. 6,869,528. Such a by-pass is a form of limiter since it limits the pressure of the water entering the filter.

I claim to have invented:
1. A system for cleaning runoff water comprising:
   a. a physical separator that removes at least one contaminant from the runoff water passing through it, said separator having an inlet for receiving runoff water from a source of such water and also has an outlet,
   b. a reservoir far receiving water from said outlet, said reservoir having an outlet,
   c. a filter receiving water from said reservoir, comprising at least a first filter cell surrounding a second filter cell, each said filter cell comprising (i) an inlet layer includ- ing an open end for inputting water to be filtered and an opposite end closed to fluid flow, and (ii) a filtration layer surrounding said inlet layer and comprising first and second porous sidewalls having filter media therebetween;

a boundary layer between each adjacent cell for preventing flow of water between cells, and a boundary wall surrounding the outermost cell, each cell having a drain that surrounds the input and filtration layers of the cell, said drain of each cell, other than the outermost cell, being surrounded by one of said boundary layers, and d. a limiter for limiting the flow of fluid from said reservoir to said filter.

2. A system for cleaning runoff water as defined in claim 1, in which said filter media will remove dissolved contaminants from the runoff water.

3. A system for cleaning runoff water as defined in claim 1, in which said limiter comprises a conduit fed by said reservoir which limits the flow of water, from said reservoir, to a rate at which said filter is efficient.

4. A system for cleaning runoff water as defined in claim 1, in which said filtration layer will remove a contaminant that will not be removed by said separator.

5. A system for cleaning runoff water as defined in claim 1, in which the flow of runoff water, from said limiter to said filter, is continuous during a rainstorm.

6. A system for cleaning runoff water as defined in claim 1, in which each said cell includes a filtering layer that will remove at least part of one contaminant that was not removed by said physical separator, from said runoff water.

7. A system for cleaning runoff water as defined in claim 1, in which said filtering layer is inefficient when the rate of flow to it exceeds a given rate, said limiter limiting the rate of flow to the filter to a rate at which the filter is efficient.

* * * * *